Oct. 1, 1940.    K. C. MONROE    2,216,693
CHIP REMOVAL MECHANISM
Filed Sept. 30, 1937    2 Sheets-Sheet 1
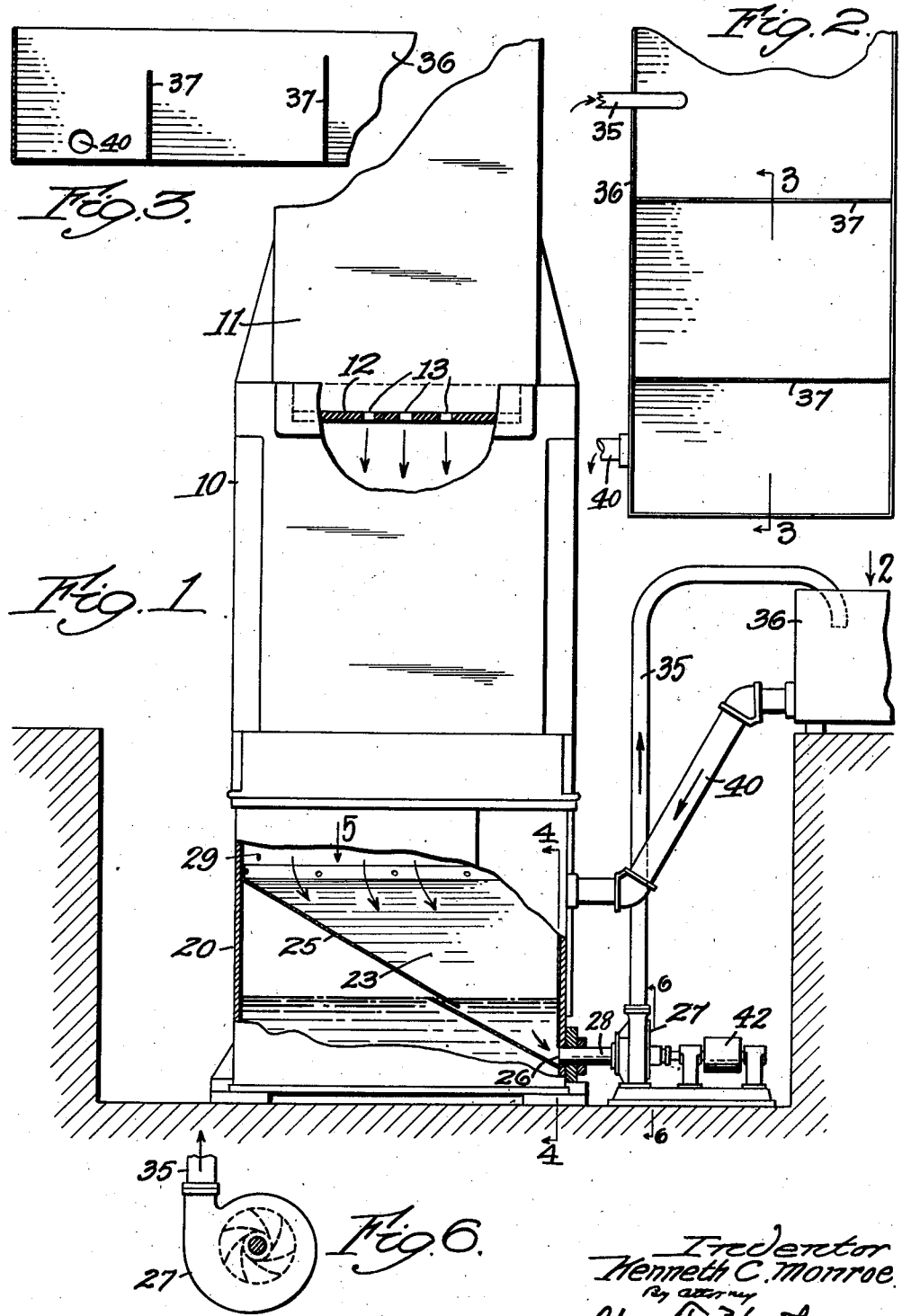

Oct. 1, 1940.  K. C. MONROE  2,216,693
CHIP REMOVAL MECHANISM
Filed Sept. 30, 1937  2 Sheets-Sheet 2

Inventor
Kenneth C. Monroe

Patented Oct. 1, 1940

2,216,693

UNITED STATES PATENT OFFICE 2,216,693

CHIP REMOVAL MECHANISM

Kenneth C. Monroe, Hudson, Mass., assignor to The Lapointe Machine Tool Company, Hudson, Mass., a corporation of Maine Application September 30, 1937, Serial No. 166,552

2 Claims. (Cl. 210—52)

This invention relates to machine tools and particularly to the removal therefrom of the chips produced by operation of the machine. My invention relates more particularly to vertical broaching machines and to other machine tools in which the chips and lubricant or coolant travel in the same direction as the tool and are discharged downwardly within the machine casing.

With modern tools and modern high speed operation, chips are produced by machine tools in surprising quantities and must be quite frequently removed. In machines of the type in question, such as vertical broaching machines, it is necessary to shut down the machine during chip removal, as the coolant circulates so rapidly and is so thoroughly agitated that the casing cannot be opened while the machine is in operation.

In a typical case of a broaching machine in actual commercial operation, it has been found necessary to stop the machine from twenty to thirty minutes in each eight-hour shift for removal of chips. This reduces the daily output of the machine and may interrupt operation of other machines in a production line.

Mechanical removal of the chips from the base of such a machine by a chain or screw conveyor or by other mechanical devices has not been found particularly satisfactory, as it involves the use of more or less complicated mechanism, with frequent clogging of the removal device and breakage of the parts thereof.

It is the general object of my invention to provide hydraulic means for removing and transporting chips from the base of such a machine to a point where the chips can be separated and further removed for disposal without interfering with regular machine operation.

In the preferred form, the chips are preliminarily separated from the main body of lubricant or coolant and are thereafter removed from the machine casing by hydraulic means for further separation and disposal.

My invention further relates to arrangements and combinations of parts which will be hereinafter described and more particularly pointed out in the appended claims.

A preferred form of the invention is shown in the drawings, in which

Fig. 1 is a front elevation, partly in section, of portions of a vertical broaching machine having my improved hydraulic chip removal mechanism associated therewith;

Fig. 2 is a partial plan view of a settling tank, looking in the direction of the arrow 2 in Fig. 1;

Fig. 3 is a partial sectional elevation of said tank, taken along the line 3—3 in Fig. 2;

Fig. 6 is a detail sectional side elevation, taken along the line 6—6 in Fig. 1.

Figure 5:
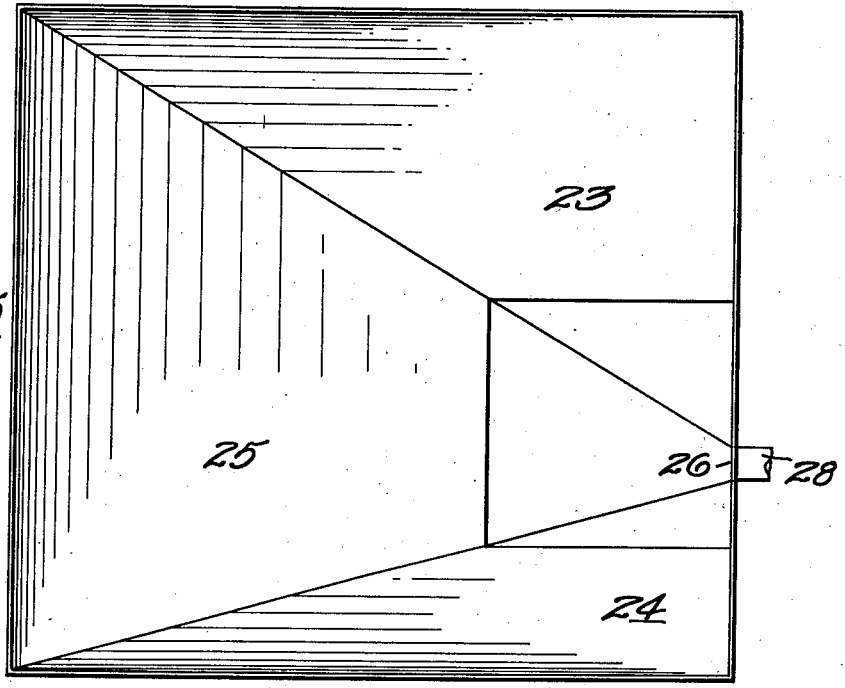
Fig. 5 is a plan view of certain parts, looking in the direction of the arrow 5 in Fig. 1.

Referring to the drawings and for purposes of illustration, I have shown portions of a vertical broaching machine having a base or casing 10 (Fig. 1), an upper frame portion 11 on which the broach-operating mechanism is supported, and a work-supporting table or platen 12 having a plurality of openings 13 through which the broaches operate. The work is placed on the platen when the broaches are in raised position, and the broaches are then forced downward through the work and through the holes 13 to perform the broaching operation.

During this operation it is customary to flood both the work and the broaches with a liquid which acts as a lubricant and coolant and which flows downward with the broaches through the openings 13 and clears the work and the broaches of chips, which are discharged into the base 10 which constitutes an oil receptacle.

The construction thus far described is commercial, and it is also the usual practice to provide a pump, connected into the lower portion of the base 10, for returning the liquid to a point above the work, the chips meanwhile settling and accumulating at the bottom of the oil receptacle.

With my improved construction, I preferably provide a sub-base or downward casing extension 20, below the usual base 10 and communicating freely therewith. The sub-base 20 forms a continuation of the oil receptacle and is provided with a false bottom or apron having inclined side portions 23 and 24 and an inclined back portion 25, all converging toward an outlet opening 26 to which a centrifugal pump 27 is connected by a pump intake pipe 28.

Figure 4:
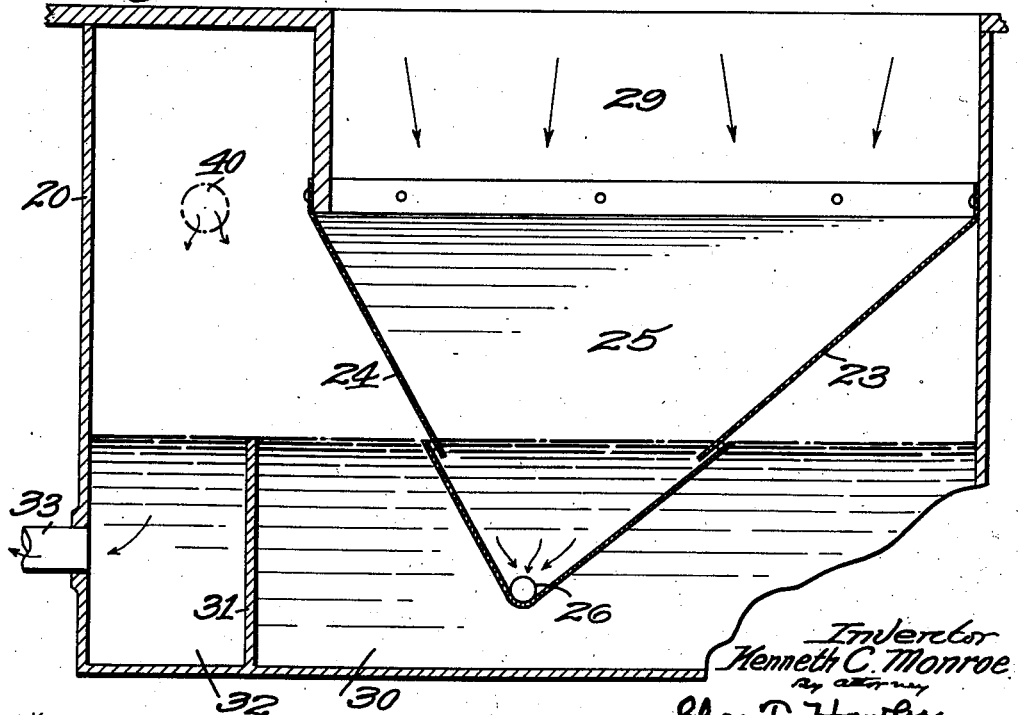
Fig. 4 is a sectional side elevation of the sub-base or lower casing of the machine, taken along the line 4—4 in Fig. 1.

The sides 23 and 24 and rear portion 25 of the false bottom or apron are all preferably formed in upper and lower overlapping portions, as clearly shown in Figs. 1 and 4.

With this construction, the mixture of chips and liquid discharged by the machine is received in the upper portion 29 of the sub-base 20 and is guided toward the outlet 26 by the converging surfaces of the false bottom or apron.

When a sufficient body of liquid has accumulated, portions of the liquid will flow backward and upward through the openings between the spaced upper and lower parts of the false bottom and will accumulate in a collecting chamber 30 in the lower part of the sub-base 20. This chamber is separated by a partition or baffle plate 31 from a second collecting chamber 32, and any small proportion of chips or dirt which is not separated out by the false bottom will collect in the bottom of the chamber 30, while the clear liquid overflows into the second chamber 32. This chamber is connected by a pipe 33 to the usual circulating pump which discharges the liquid above the work for further lubricating and cooling utility.

Substantially all of the chips and dirt are guided by the inclined false bottom to the outlet 26 and to the intake pipe 28 of the centrifugal pump 27, which pump discharges the combined liquid and chips through a pipe 35 into a separating tank 36 having baffle plates 37 mounted therein.

As the liquid flows through the tank 36 and over the successive baffle plates, the chips accumulate in the bottom of the tank, while the relatively clear liquid returns through a pipe 40 to a point in the sub-base 20 outside of the false bottom 24 and in free communication with the collecting chamber 32 from which the liquid is returned to the broaching machine.

The settling tank 36 may be of any desired shape and size and is to be so arranged that the chips may be conveniently removed by a shovel or other tool at any time and without interfering with the operation of the machine.

The centrifugal pump 27 is preferably arranged as shown in Fig. 6, with the discharge pipe 35 opening out of the lower portion of the casing. The discharge passage of the pump in its lower portion is of sufficient size so that it will not be clogged by the amount of chips which might settle out of the impeller portion of the pump.

The pump 27 may be driven from any suitable motor, which motor may be belt-connected to a pump pulley 42 (Fig. 1) or may be directly connected if desired. The pump motor circuit is preferably tied in with the circuit of the main motor which operates the broaching machine, so that the pump 27 will be started and stopped simultaneously with the starting and stopping of the main motor.

With the described construction, the removal of chips from the base of the broaching machine is continuous during the operation of the machine, and shutting down of the machine for chip removal is thus entirely avoided. Furthermore, the chip-handling apparatus involves no moving parts whatever except the pump impeller, and the pump is relatively small and inexpensive and can be cheaply and easily replaced if it becomes badly worn.

The pump 27 should be of such size, however, as will remove a substantial volume of liquid, so that the amount of chips per unit of liquid passing through the pump will be relatively small. In a typical installation, the pump is proportioned to discharge approximately fifty gallons of liquid per minute into the separating tank, while a substantially larger volume of liquid is withdrawn from the chamber 32 through the pipe 33 by the usual circulating pump of the machine tool.

In the claims, the term "liquid" is to be understood as including liquids having either cooling or lubricating functions or both.

Having thus described my invention and the advantages thereof, I do not wish to be limited to the details herein disclosed, otherwise than as set forth in the claims, but what I claim is:

1. In a machine tool, a lubricating system comprising a receptacle into which a substantial volume of lubricating liquid and chips is downwardly discharged, said receptacle having a false bottom with downwardly converging portions which guide the chips to a separate discharge outlet, and said receptacle having a chamber for the collection of clear oil below said false bottom, hydraulic means additional to said lubricating system and effective to temporarily remove a portion only of the liquid and substantially all of the chips from said receptacle and from said lubricating system through said discharge outlet, with the remaining lubricating liquid passing direct to said chamber in the lowermost part of said receptacle, means to separate from the chips the liquid removed therewith through said discharge outlet, means to return the relatively clear separated liquid to said chamber for direct recirculation with said remaining liquid, and means to recirculate all of the lubricating liquid in said machine tool.

2. In a machine tool, a lubricating system comprising a receptacle into which a substantial volume of lubricating liquid and chips is downwardly discharged, said receptacle having a false bottom with downwardly converging portions which guide the chips to a separate discharge outlet, and said receptacle having a chamber for the collection of clear oil below said false bottom, said false bottom having vertically overlapping parts spaced to permit backward and upward flow of relatively clear liquid to said chamber, hydraulic means additional to said lubricating system and effective to temporarily remove a portion only of the liquid and substantially all of the chips from said receptacle and from said lubricating system through said discharge outlet, with the remaining lubricating liquid passing direct to said chamber in the lowermost part of said receptacle, means to separate from the chips the liquid removed therewith through said discharge outlet, means to return the relatively clear separated liquid to said chamber for direct recirculation with said remaining liquid, and means to recirculate all of the lubricating liquid in said machine tool.

KENNETH C. MONROE.